United States Patent
Kitchenside et al.

(10) Patent No.: US 8,451,687 B2
(45) Date of Patent: May 28, 2013

(54) IMAGING WITH VECTOR MEASUREMENTS

(75) Inventors: Phil Kitchenside, Kent (GB); Gabriele Busanello, London (GB); Henk Keers, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 862 days.

(21) Appl. No.: 12/367,328

(22) Filed: Feb. 6, 2009

(65) Prior Publication Data
US 2010/0202250 A1 Aug. 12, 2010

(51) Int. Cl.
G01V 1/00 (2006.01)
(52) U.S. Cl.
USPC .............................. 367/73; 367/38
(58) Field of Classification Search
USPC ...................................... 367/38, 73
See application file for complete search history.

(56) References Cited

U.S. PATENT DOCUMENTS

| | | | |
|---|---|---|---|
| 4,752,916 A * | 6/1988 | Loewenthal | 367/24 |
| 6,021,092 A | 2/2000 | Paffenholz et al. | |
| 7,050,355 B2 * | 5/2006 | Robertsson et al. | 367/19 |
| 7,092,823 B2 * | 8/2006 | Lailly et al. | 702/14 |
| 7,480,206 B2 * | 1/2009 | Hill | 367/73 |
| 2008/0192571 A1 | 8/2008 | Vaage et al. | |
| 2008/0228403 A1 | 9/2008 | Robertsson | |
| 2009/0022009 A1 | 1/2009 | Ozdemir et al. | |
| 2010/0118651 A1 * | 5/2010 | Liu et al. | 367/50 |
| 2010/0161235 A1 * | 6/2010 | Ikelle | 702/17 |

FOREIGN PATENT DOCUMENTS
WO 2008081156 A1 7/2008

OTHER PUBLICATIONS
PCT Search Report, dated Sep. 16, 2010, Application No. PCT/US2010/023095.
Claerbout, et al., Toward a Unified Theory of Reflector Mapping, Geophysics, Jun. 1971, pp. 467-481, vol. 36, No. 3.
Beylkin, Imaging of Discontinuities in the Inverse Scattering Problem by Inversion of a Casual Generalized Radon Transform, American Institute of Physics, Jan. 1985, pp. 99-108, vol. 26.
Tarantola, Inversion of Seismic Reflection Data in the Acoustic Approximation, Geophysics, Aug. 1984, pp. 1259-1266, vol. 48, No. 8.

* cited by examiner

*Primary Examiner* — Isam Alsomiri
*Assistant Examiner* — Krystine Breier

(57) ABSTRACT

A technique includes receiving seismic data, which are indicative of pressure measurements and pressure gradient measurements acquired in a seismic survey of at least one subterranean formation. The technique includes modeling an image of the subterranean formation(s) as a function of the pressure measurements and the pressure gradient measurements. The technique includes determining the image based on the modeling.

20 Claims, 5 Drawing Sheets

IMAGING WITH VECTOR MEASUREMENTS

BACKGROUND

The invention generally relates to imaging with vector measurements.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones and/or accelerometers), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

In an embodiment of the invention, a technique includes receiving seismic data, which are indicative of pressure measurements and pressure gradient measurements acquired in a seismic survey of at least one subterranean formation. The technique includes modeling an image of the subterranean formation(s) as a function of the pressure measurements and the pressure gradient measurements. The technique includes determining the image based on the modeling.

In another embodiment of the invention, a system includes an interface and a processor. The interface receives seismic data, which are indicative of pressure measurements and pressure gradient measurements acquired in a seismic survey of at least one subterranean formation. The processor processes the seismic data to determine an image of the subterranean formation(s) based on a model of the image as a function of the pressure measurements and the pressure gradient measurements.

Advantages and other features of the invention will become apparent from the following drawing, description and claims.

DETAILED DESCRIPTION

Figure 1:
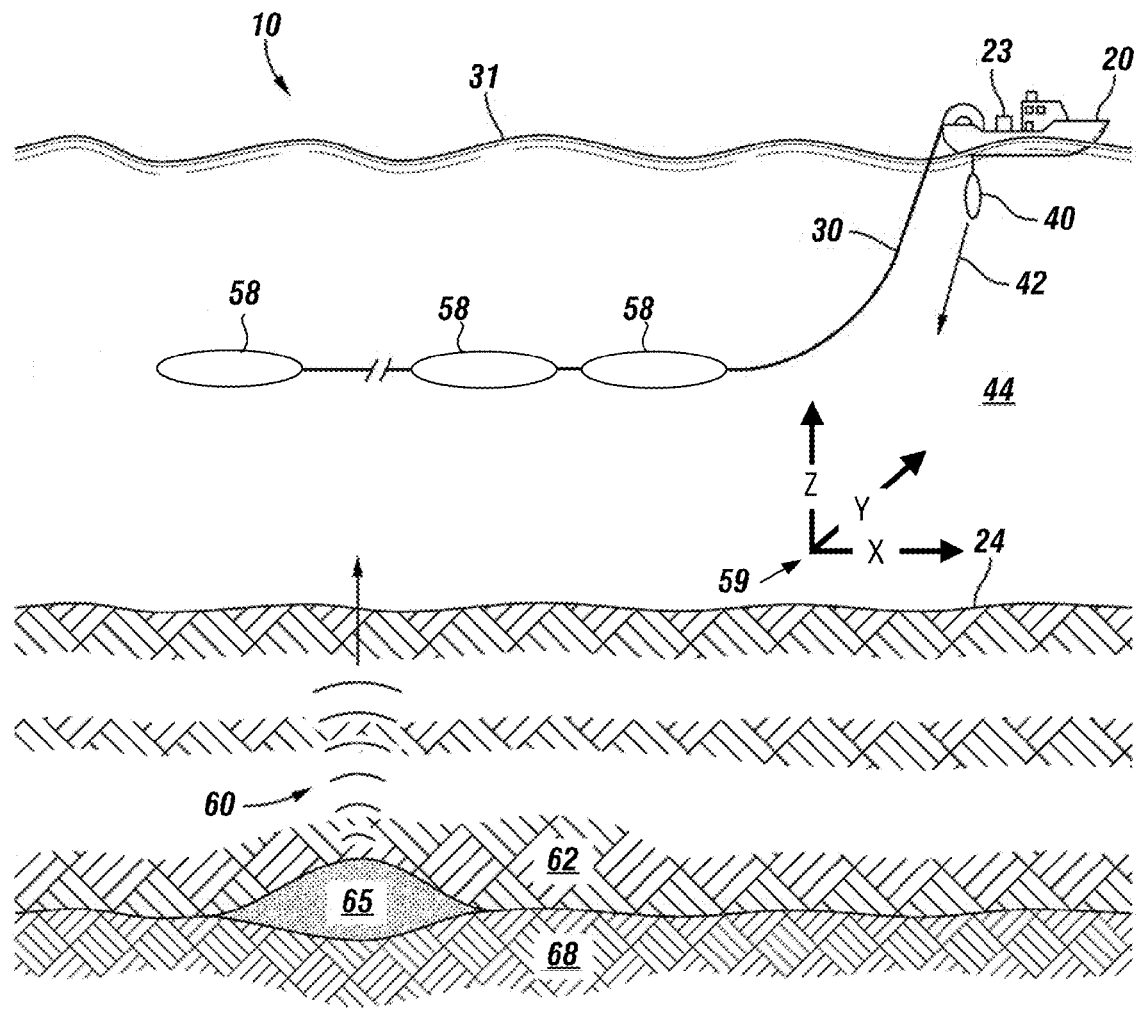
FIG. 1 is a schematic diagram of a marine-based seismic data acquisition system according to an embodiment of the invention.

FIG. 1 depicts an embodiment 10 of a marine seismic data acquisition system in accordance with some embodiments of the invention. In the system 10, a survey vessel 20 tows one or more seismic streamers 30 (one exemplary streamer 30 being depicted in FIG. 1) behind the vessel 20. The seismic streamers 30 may be several thousand meters long and may contain various support cables (not shown), as well as wiring and/or circuitry (not shown) that may be used to support communication along the streamers 30. In general, each streamer 30 includes a primary cable into which is mounted seismic sensors 58 that record seismic signals.

In accordance with embodiments of the invention, the seismic sensors 58 may be pressure sensors only or may be multi-component seismic sensors. For the case of multi-component seismic sensors, each sensor is capable of detecting a pressure wavefield and at least one component of a particle motion that is associated with acoustic signals that are proximate to the multi-component seismic sensor. Examples of particle motions include one or more components of a particle displacement, one or more components (inline (x), crossline (y) and vertical (z) components (see axes 59, for example)) of a particle velocity and one or more components of a particle acceleration.

Depending on the particular embodiment of the invention, the multi-component seismic sensor may include one or more hydrophones, geophones, particle displacement sensors, particle velocity sensors, accelerometers, pressure gradient sensors, or combinations thereof.

For example, in accordance with some embodiments of the invention, a particular multi-component seismic sensor may include a hydrophone for measuring pressure and three orthogonally-aligned accelerometers to measure three corresponding orthogonal components of particle velocity and/or acceleration near the seismic sensor. It is noted that the multi-component seismic sensor may be implemented as a single device or may be implemented as a plurality of devices, depending on the particular embodiment of the invention. A particular multi-component seismic sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, a particular point, seismic data indicative of the pressure data with respect to the inline direction.

The marine seismic data acquisition system 10 includes a seismic source 104 that may be formed from one or more seismic source elements, such as air guns, for example, which are connected to the survey vessel 20. Alternatively, in other embodiments of the invention, the seismic source 104 may operate independently of the survey vessel 20, in that the seismic source 104 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic source 104 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are acquired by the sources 40 produce corresponding reflected acoustic signals, or pressure waves 60, which are sensed by the seismic sensors 58. It is noted that the pressure waves that are received and sensed by the seismic sensors 58 include "up going" pressure waves that propagate to the sensors 58 without reflection, as well as "down going" pressure waves that are produced by reflections of the pressure waves 60 from an air-water boundary 31.

The seismic sensors 58 generate signals (digital signals, for example), called "traces," which indicate the acquired measurements of the pressure wavefield and particle motion (if the sensors are particle motion sensors). The traces are recorded and may be at least partially processed by a signal processing unit 23 that is deployed on the survey vessel 20, in accordance with some embodiments of the invention. For example, a particular multi-component seismic sensor may provide a trace, which corresponds to a measure of a pressure wavefield by its hydrophone; and the sensor may provide one or more traces that correspond to one or more components of particle motion, which are measured by its accelerometers.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23.

Seismic imaging is used for purposes of producing a picture of the subsurface. As described below, pressure measurement data as well as pressure gradient data (otherwise called vector data) may be used for purposes of generating the image. In order to prepare the seismic data for the imaging, various data processing steps may first be performed. For example, in accordance with some embodiments of the invention, the seismic data acquired by the seismic sensors may be processed in accordance with a technique 100 that is depicted in FIG. 2.

Figure 2:
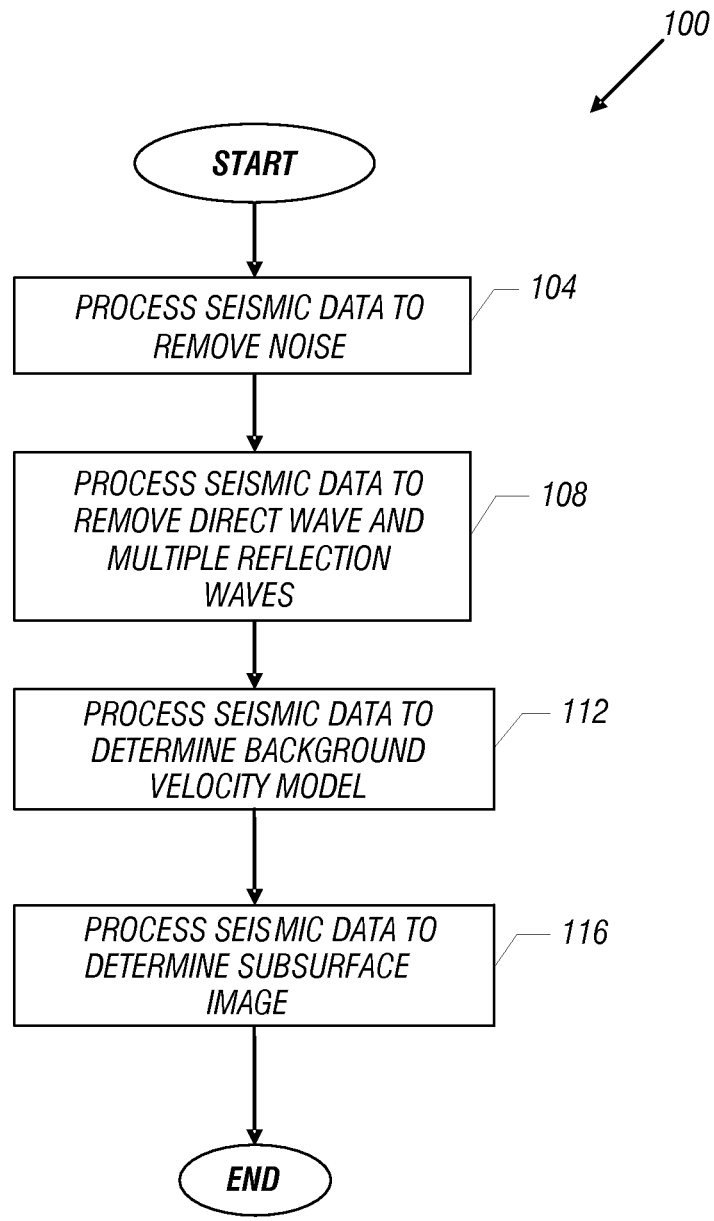
FIG. 2 is a flow diagram depicting a technique to process seismic data according to an embodiment of the invention.

Referring to FIG. 2, the technique 100 includes processing (block 104) the seismic data to remove, or attenuate, noise. In this regard, the noise removal refers to the removal of acquisition-related noise, such as vibration noise, flow-induced noise, noise from nearby seismic vessels, noise from nearby oil platforms, etc.

After the noise is attenuated, the technique 100 includes processing (block 108) the seismic data to remove the direct waves and any multiple reflection waves. More specifically, the recorded wavefield may be decomposed into waves that are scattered a various number of times: the direct wave, which is not scattered; primary waves, which are scattered once; twice-scattered waves; etc. When generating an image of the subsurface, it is assumed that all waves except the primary waves have been removed from the seismic data. It is noted that block 108 may be accomplished using conventional multiple removal techniques.

After the multiple removal that is performed in block 108, the seismic data is processed to determine a background velocity model, pursuant to block 112. For example, migration velocity analysis may be performed to derive the background velocity model.

After the noise attenuation (block 104), multiple removal (block 108) and derivation of the background velocity model (block 112), the resulting seismic data may then be processed (block 116) to determine the subsurface image.

As described herein, the pressure gradient data may be used by itself or in conjunction with the pressure measurement data for purposes of generating the subsurface image. It is assumed herein that multiples have been removed from the processed data, whether this data includes pressure measurement data or not. Furthermore, it is assumed herein that a suitable background velocity model has been derived using, for example, migration velocity analysis. The subsurface image may be derived as follows. The pressure waves are modeled by a first order Born approximation, as set forth below:

$$u_1(r,s,\omega) = \int \omega^2 g(r,x,\omega) c(x) c_b^{-3}(x) g(x,s,\omega) dx, \quad \text{Eq. 1}$$

where "$c_b$" represents the background velocity model, which is assumed to be known; "c" represents the image perturbation, or function; "$u_1$" represent the first order Born approximation; "g(r,s,ω)" represents the Green's function, which corresponds to the background medium of waves excited at the source s and recorded at the receiver r.

Eq. 1 assumes that source deconvolution has been applied. It is noted, however, that source deconvolution is not essential, as the techniques that are described herein may be reapplied when source deconvolution has not been applied. For the specific example depicted in Eq. 1, one of the Green's functions in Eq. 1 is convolved with the source wavelet.

The pressure gradient may be derived by taking the derivative of the pressure $u_1$ with respect to the receiver position r, as set forth below:

$$\nabla_r u_1(r,s,\omega) = \int \omega^2 \nabla_r g(r,x,\omega) c(x) c_b^{-3}(x) g(x,s,\omega) dx. \quad \text{Eq. 2}$$

Eq. 2 describes, to the first order, the propagation of the scattered gradient (i.e., the "vector") waves through the medium.

Given the above-described modeled pressure and pressure gradient waves, which are functions of the image function c, the image function c may be derived through an inversion process that involves minimizing a cost function. In particular, the cost function (called "F" herein) may be minimized with respect to the image function c, as set forth below:

$$\frac{dF}{dc} = 0. \quad \text{Eq. 3}$$

The cost function F may be described as follows:

$$F = \sigma^{-2} \int |d(r, s, \omega) - (u_0 + u_1)(r, s, \omega)|^2 w(r, s, \omega) dr\, ds\, d\omega + \quad \text{Eq. 4}$$

$$\sigma_{rx}^{-2} \int |v_{rx}(r, s, \omega) - (\partial_{rx} u_0 + \partial_{rx} u_1)(r, s, \omega)|^2 w_{rx}(r, s, \omega) dr\, ds$$

$$d\omega + \sigma_{ry}^{-2} \int |v_{ry}(r, s, \omega) - (\partial_{ry} u_0 + \partial_{ry} u_1)(r, s, \omega)|^2$$

$$w_{ry}(r, s, \omega) dr\, ds\, d\omega + \sigma_{rz}^{-2}$$

$$\int |v_{rz}(r, s, \omega) - (\partial_{rz} u_0 + \partial_{rz} u_1)(r, s, \omega)|^2 w_{rz}(r, s, \omega) dr\, ds\, d\omega,$$

where "σ," "$\sigma_{rx}$," and "$\sigma_{rz}$," are weight functions.

Depending on the particular embodiment of the invention, one or more of the weight functions may be set equal to zero, although at least one of the weight functions has a non-zero value. Alternatively, the weight functions may be proportional to the covariance matrices, which may be possibly frequency dependent. Alternatively, other techniques may be used to select the weight values.

In Eq. 4, the functions w, $w_x$, $w_y$, and $w_z$ are imaging weight functions. They may be set either equal to one, which is the case in most imaging methods that are not based on ray methods. If the Green's functions are computed using ray theory, then the weight functions may be determined using the method developed in Beylkin, G., 1985, *Imaging of Dis-* continuities in *The Inverse Scattering Problem by Inversion of a Causal Generalized Radon Transform*, J. Math. Phys., 26, 99-108, in which off-diagonal elements of the Hessian are taken into account. In Eq. 4, "$u_0(r,s,\omega)$" represents the Green's function convolved with the source wavelet.

From Eq. 5, the image c may be derived using, for example, the techniques set forth in Tarantola, A., 1984. Inversion of Seismic Reflection Data In The Acoustic Approximation, Geophysics, 49, 1259-1266 and in PCT Publication No. WO2008/081156, entitled, "ACCURATE SEISMIC PROCESSING TECHNIQUES," which published on Jul. 10, 2008. In particular, the diagonal of the normal equations may be taken, as done by Tarantola. Alternatively, asymptotic methods may be used to take off-diagonal elements into account by choosing the weight function in an appropriate way, as set forth in Beylkin.

For purposes of deriving an explicit expression of the image function c, Tarantola's method may be used and the weight function may be chosen equal to one. In this case, the image function $c(x)$ may be represented as follows:

$$c(x) = c_0^3(x) \frac{A + B}{\int \omega^4 (\sigma^2 |s(\omega) g(r,x,\omega) g(x,s,\omega)|^2 + \sum_i \sigma_{r_i}^2 |s(\omega) g_{r_i}(r,x,\omega) g_{r_i}(x,s,\omega)|^2) dr ds d\omega}. \quad \text{Eq. 5}$$

where "A" and "B" are as follows:

$$A = \int \omega^2 (d(r,s,\omega) - u_0(r,s,\omega)) \overline{g(r,x,\omega) g(x,s,\omega)}, \quad \text{and} \quad \text{Eq. 6}$$

$$B = \omega^2 \sum_i (d_{r_i}(r,s,\omega) - v_{r_i}(r,s,\omega)) \overline{g_{r_i}(r,x,\omega) v_{r_i}(x,s,\omega)} dr ds d\omega. \quad \text{Eq. 7}$$

If only the vertical gradient of the pressure data is used, the image function $c(x)$ may be written as follows:

$$c(x) = c_0^3(x) \frac{\int \omega^2 (d(r,s,\omega) - u_0(r,s,\omega)) \overline{g(r,x,\omega) g(x,s,\omega)} dr ds d\omega}{\int \omega^4 \sigma^2 |g(r,x,\omega) g(x,s,\omega) dr ds d\omega|}. \quad \text{Eq. 8}$$

It is noted that the image function $c(x)$ may take on many different forms, depending on the particular embodiment of the invention. In addition to the techniques set forth above, imaging may also be applied over midpoints, or midpoints and offsets (where the midpoint is defined as $m=(s+r)/2$ and the offset is defined as $h=(s-r)/2$), a technique that is typically done in Kirchhoff migration. Alternatively, the imaging condition for each source may be applied separately, as done in wave equation migration.

In other embodiments of the invention, the Green's function may be computed using a waveform modeling technique, such as ray theory, Kirchhoff imaging, beam techniques, which give rise to beam imaging conditions, one way equations, which give rise to wave equation migration and finite differencing, which results in reverse time migration. For example, for the following Green's function:

$$g(r,s) = A(r,s) e^{i\omega T(r,s)}. \quad \text{Eq. 9}$$

The Kirchhoff imaging produces the following image function:

$$c(x) = c_0^3(x) \frac{\int (d_{r_z}(r,s,\omega) - v_{r_z}(r,s,\omega)) A(r,x) A(x,s) e^{-i\omega(T(r,x)+T(x,s))} dr ds d\omega}{2 \int \omega^2 \sigma_{r_i}^2 |s(\omega) A(r,x) A(x,s)|^2 dr ds d\omega}. \quad \text{Eq. 10}$$

In the time domain, the image function may be alternatively expressed as follows:

$$c(x) = c_0^3(x) \frac{\int \int \begin{pmatrix} d_{r_z}(r,s,t=T(r,x)+T(x,s)) - \\ v_{r_z}(r,s,t=T(r,x)+T(x,s)) \end{pmatrix} A(r,x) A(x,s) dr ds}{2 \int \omega^2 \sigma_{r_i}^2 |s(\omega) A(r,x) A(x,s)|^2 dr ds d\omega}, \quad \text{Eq. 11}$$

Wave equation migration may be represented as follows:

$$c(x) = c_0^3(x) \frac{\int (d_{r_z}(r,s,\omega) - v_{r_z}(r,s,\omega)) g_{r_z}^+(r,x,\omega) g_{r_z}^+(x,s,\omega) dr ds d\omega}{\int \omega^2 \sigma_{ri}^2 |g_{r_z}^+(r,x,\omega) g_{r_z}^+(x,s,\omega)| dr ds d\omega}, \quad \text{Eq. 12}$$

where "$g_{r_z}^+(r,x,\omega)$" represents the upgoing Green's function from the scattering point to the receiver of the vertical particle velocity and "$g_{r_z}^+(x,s,\omega)$" represents the corresponding Green's function to form the scattering point to the source.

Figure 3:
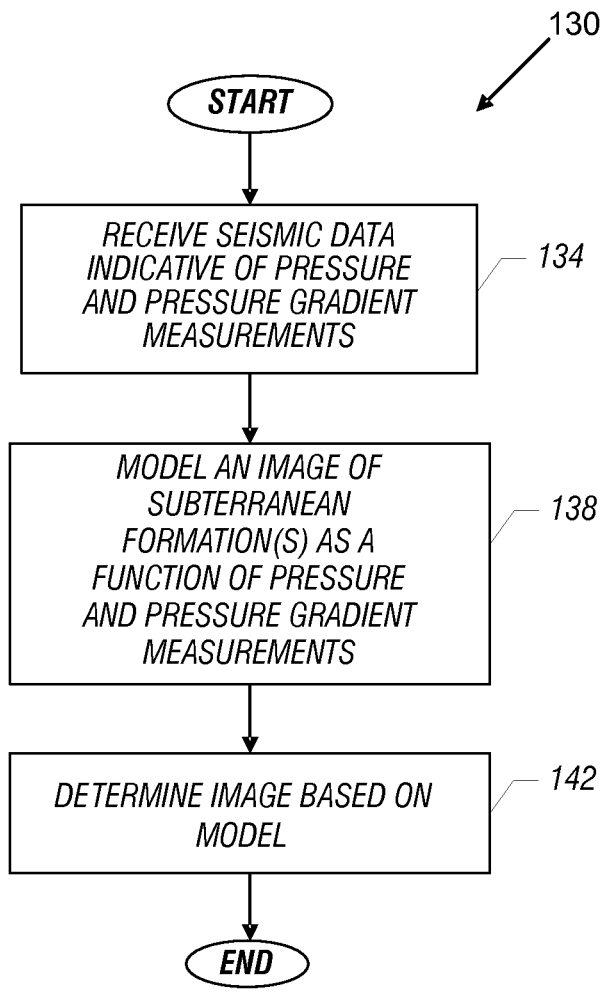
FIGS. 3 and 4 are flow charts depicting techniques to generate an image of at least one subterranean formation according to embodiments of the invention.

To summarize, FIG. 3 depicts a technique 130 that may be generally applied in accordance with embodiments of the invention. The technique 130 includes receiving (block 134) seismic data, which are indicative of pressure and pressure gradient measurements. An image of the subsurface is modeled (block 138) as a function of the pressure and pressure gradient measurements. An image of the subsurface is determined (block 142) based on this model.

Figure 4:
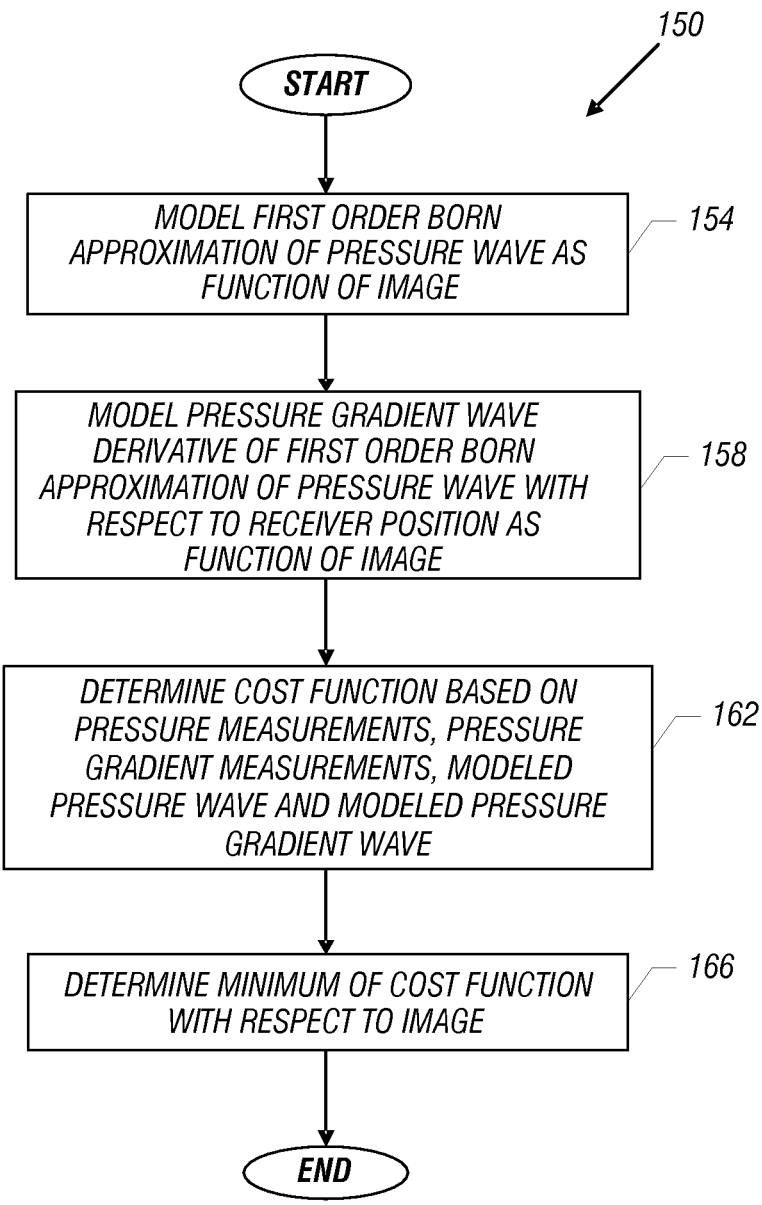

More specifically, in accordance with some embodiments of the invention, a technique 150 that is depicted in FIG. 4 may be used. Pursuant to the technique 150, the first Born approximation of a pressure wave is modeled as a function of the image, pursuant to block 154, and the pressure gradient wave is modeled as the derivative of the first order Born approximation of the pressure wave with respect to the receiver position as a function of the image, pursuant to block 158. A cost function is then determined (block 162) based on the pressure and pressure gradient measurements. A minimum of the cost function is subsequently determined (block 166) with respect to the image for purposes of determining the image function $c(x)$.

Figure 5:
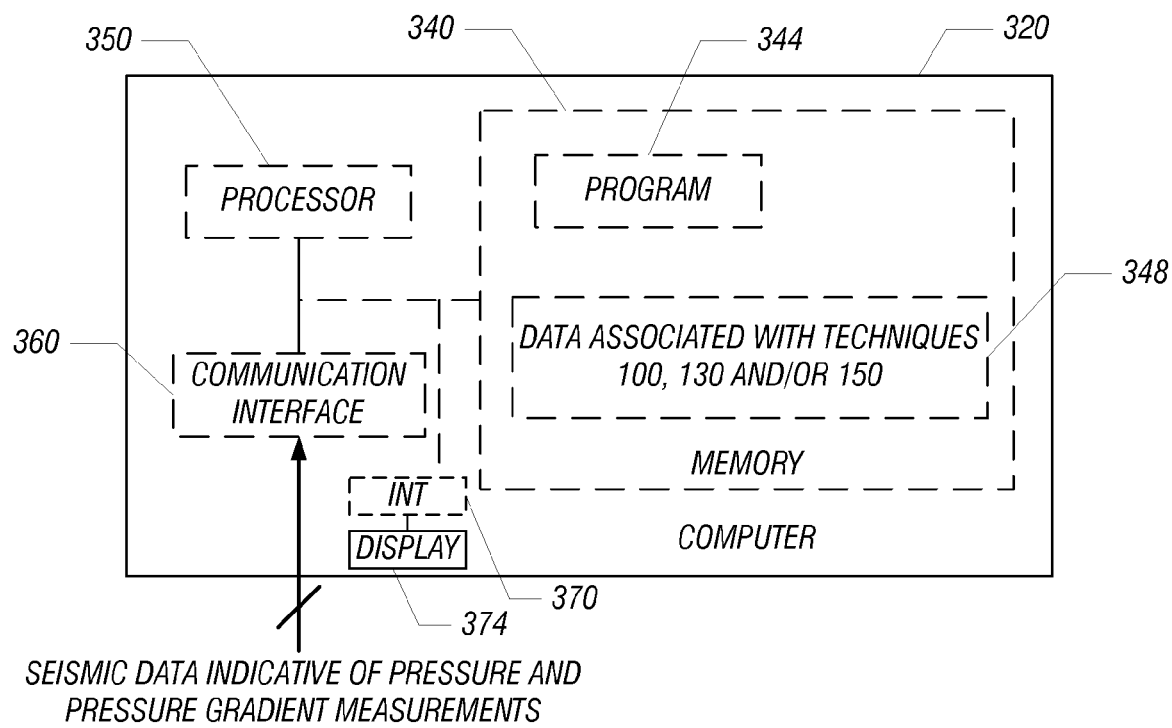
FIG. 5 is a schematic diagram of a seismic data processing system according to an embodiment of the invention.

Referring to FIG. 5, in accordance with some embodiments of the invention, a data processing system 320 may perform at least part of the techniques that are disclosed herein, such as techniques related to receiving seismic data indicative of pressure and pressure gradient measurements acquired in a seismic survey of at least one subterranean formation; modeling an image of the subterranean formation(s) as a function of the pressure and pressure gradient measurements; based on the modeling, determining an image of the subterranean formation(s); modeling a pressure wave a first order Born approximation; modeling a pressure gradient wave as a derivative of a first order Born approximation of a pressure wave with respect to receiver position; selectively weighting components of an imaging function associated with different particle motion components; displaying the image on a display 374 of the system 320; etc.

The system 320 may be located on one of the streamers 30, on each streamer 30, distributed among the streamers 30, on the seismic source 104, on the survey vessel 30, at a remote land-based facility, etc. In accordance with some embodiments of the invention, the system 320 may include a processor 350, such as one or more microprocessors and/or microcontrollers.

The processor 350 may be coupled to a communication interface 360 for purposes of receiving data indicative of seismic measurements, model parameters, geophysical parameters, survey parameters, etc. The data pertaining to the seismic measurements may be pressure data, multi-component data, etc.

As a non-limiting example, the interface 360 may be a USB serial bus interface, a network interface, a removable media (such as a flash card, CD-ROM, etc.) interface or a magnetic storage interface (IDE or SCSI interfaces, as examples). Thus, the interface 360 may take on numerous forms, depending on the particular embodiment of the invention.

In accordance with some embodiments of the invention, the interface 360 may be coupled to a memory 340 of the system 320 and may store, for example, various input and/or output data sets 348 involved with the techniques that are described herein. The memory 340 may store program instructions 344, which when executed by the processor 350, may cause the processor 350 to perform at least part of the techniques that are described herein and display results obtained via the technique(s) on the display 374 of the system 320, in accordance with some embodiments of the invention. As shown in FIG. 5, the system 320 may include a display interface 370 that couples the display device 374 to the system 320.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
receiving seismic data indicative of pressure measurements and pressure gradient measurements acquired in a seismic survey of at least one subterranean formation;
modeling an image of said at least one subterranean formation as a function of the pressure measurements and the pressure gradient measurements;
modeling a pressure wave as a function of the image;
modeling a pressure gradient wave as a function of the image;
based on the modeling, determining the image, the determining comprising:
determining a function based on the pressure measurements, the pressure gradient measurements, the modeled pressure wave and the modeled pressure gradient wave; and
determining an extrema of the function with respect to the image; and
displaying the image.

2. The method of claim 1, wherein the act of modeling the pressure wave comprises:
determining a first order Born approximation of the pressure wave.

3. The method of claim 1, wherein the act of modeling the pressure gradient wave comprises:
determining a derivative of a first order Born approximation of the pressure wave with respect to a receiver position.

4. The method of claim 1, wherein the image is modeled as a function comprising components associated with different gradient axes, the method further comprising:
selectively weighting the components.

5. The method of claim 4, wherein the act of selectively weighting comprises:
assigning a nonzero weight to at least one of the components.

6. The method of claim 4, wherein the act of selectively weighting comprises:
assigning a unity weight to each of the components.

7. The method of claim 1, wherein the seismic data comprises data acquired in a towed seismic survey.

8. The method of claim 1, wherein the pressure gradient measurements comprise particle velocity measurements.

9. The method of claim 1, further comprising:
processing the seismic data to remove noise from the pressure and pressure gradient measurements.

10. The method of claim 1, further comprising:
processing the seismic data to remove multiple reflection waves from the pressure and pressure gradient measurements.

11. The method of claim 1, further comprising:
processing the seismic data to determine a background velocity model.

12. A system comprising:
an interface to receive seismic data indicative of pressure measurements and pressure gradient measurements acquired in a seismic survey of at least one subterranean formation; and
a processor to process the seismic data to:
model an image of said at least one subterranean formation as a function of the pressure measurements and the pressure gradient measurements;
model a pressure wave as a function of the image;
model a pressure gradient wave as a function of the image;
based on the modeling, determine the image, the determination comprising:
determining a function based on the pressure measurements, the pressure gradient measurements, the modeled pressure wave and the modeled pressure gradient wave; and
determining an extrema of the function with respect to the image; and
display the image.

13. The system of claim 12, wherein the image is modeled as a function comprising components associated with different gradient axes, and the processor is adapted to selectively weight the components.

14. The system of claim 13, wherein the processor is adapted to assign a nonzero weight to at least one of the components.

15. The system of claim 13, wherein the processor is adapted to assigning a unity weight to each of the components.

16. The system of claim 13, wherein the seismic data comprises data acquired in a towed seismic survey.

17. The system of claim 12, further comprising:
a streamer to acquire the seismic data.

18. The system of claim 17, further comprising:
a vessel to tow the streamer.

19. The system of claim 12, further comprising:
a display device, wherein the processor is adapted to display the image on the display device.

20. The system of claim 12, wherein the processor is further adapted to process the seismic data to perform at least one of the following:

migration velocity analysis, multiple reflection removal and noise attenuation.

* * * * *